Figure 5:
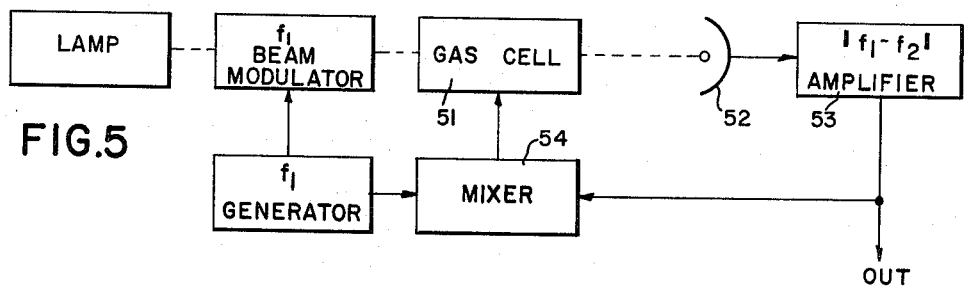

March 9, 1965 W. E. BELL ETAL 3,173,082
OPTICALLY DRIVEN SPIN PRECESSION METHOD AND APPARATUS
Filed March 14, 1961 2 Sheets-Sheet 1
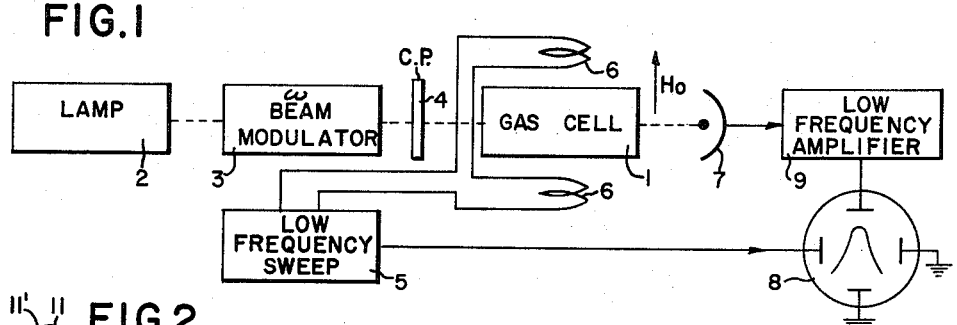
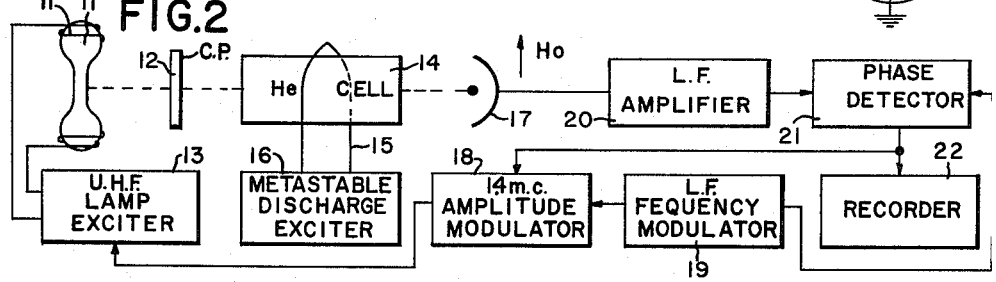
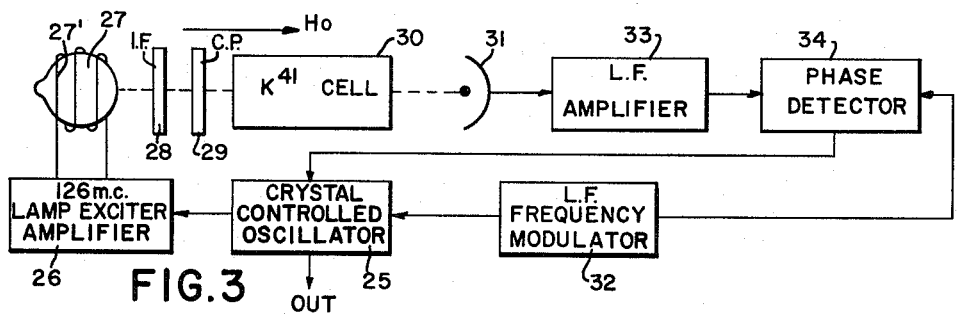
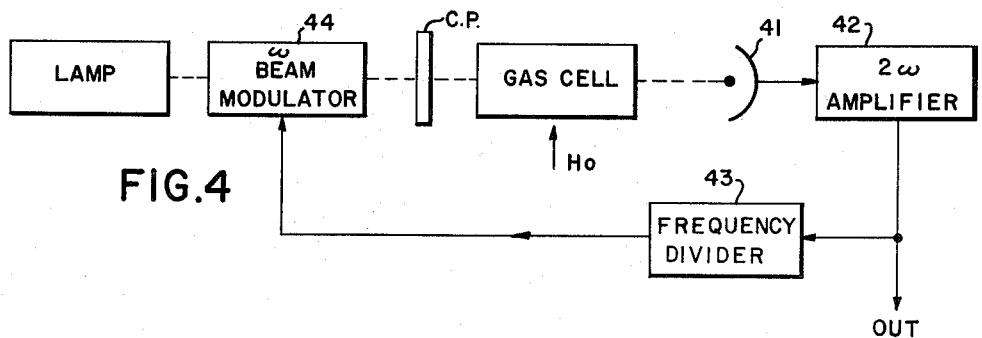
INVENTORS
WILLIAM E. BELL
ARNOLD L. BLOOM
BY Paul B. Hunter
ATTORNEY March 9, 1965   W. E. BELL ETAL   3,173,082
OPTICALLY DRIVEN SPIN PRECESSION METHOD AND APPARATUS
Filed March 14, 1961   2 Sheets-Sheet 2

INVENTORS
WILLIAM E. BELL
ARNOLD L. BLOOM
BY Paul D. Hunter
ATTORNEY

United States Patent Office 3,173,082
Patented Mar. 9, 1965

3,173,082
OPTICALLY DRIVEN SPIN PRECESSION METHOD AND APPARATUS
William E. Bell, Palo Alto, and Arnold L. Bloom, Menlo Park, Calif., assignors to Varian Associates, Palo Alto, Calif., a corporation of California
Filed Mar. 14, 1961, Ser. No. 95,581
19 Claims. (Cl. 324—.5)

The present invention relates in general to electronic devices such as frequency standards, magnetometers, and spectrometers, which utilize quantum resonance effects, and more particularly to a novel optical pumping technique for creating a precessing spin polarization in an assemblage of quantum systems.

The term "optical pumping" is applied to a technique for producing a non-equilibrium population difference or polarization between the magnetic sublevels of an atom or other quantum system wherein an assemblage of such quantum systems is irradiated by optical radiation of such spectral characteristics (frequency-intensity distribution, propagation direction, and polarization) that the absorption and re-radiation of optical radiation by the quantum systems effect a net re-distribution of the sublevel populations. Such radiation is referred to herein as "optical pumping radiation." It should be noted that in some instances the natural spectral characteristics of an optical source are sufficient, and in other instances external interference filters and/or polarizers may be used.

Recently, optical pumping techniques have been utilized for the purpose of detecting magnetic resonance spin precessions produced by radio-frequency alternating magnetic fields directly coupling the sublevels between which the non-equilibrium population difference exists. One particularly simple and effective method of detection consists of monitoring the intensity of the pumping radiation which is transmitted through the quantum systems without absorption, as under proper conditions the magnitude of this intensity decreases sharply as the frequency of the radio-frequency field passes through the resonance frequency separating the magnetic sublevels, and also near resonance the transmitted intensity can be modulated at a frequency determined by the precession frequency. For further discussion, reference is made to an article by co-inventor Arnold L. Bloom entitled "Optical Pumping" published in the October 1960 issue of Scientific American, pages 72–80.

The present invention relates to a new and clearly distinguishable optical pumping effect reported by the inventors in the March 15, 1961 issue of Physical Review Letters in which spin precessions are produced entirely by the optical pumping radiation without the necessity of a directly-coupled alternating magnetic field, and has as its principal object the utilization of this optically driven spin precession effect to provide a new degree of freedom in optical pumping instrumentation.

One feature of the present invention is the provision of a technique for producing spin precessions in an assemblage of quantum systems by intensity modulating the optical pumping radiation beam.

Another feature of the present invention is the provision of resonance-stabilized and self-oscillating systems, particularly useful as magnetometers and frequency standards, utilizing the detection of optical radiation from an intensity modulated optical pumping source which is transmitted through a gas cell without absorption.

Another feature of the present invention is the provision of a novel technique for optically detecting the frequency difference between an intensity modulated optical pumping source and a spin-coupled radio frequency source.

Still another feature of the present invention is the provision of a plurality of intensity modulated optical pumping lamps.

Figure 6:
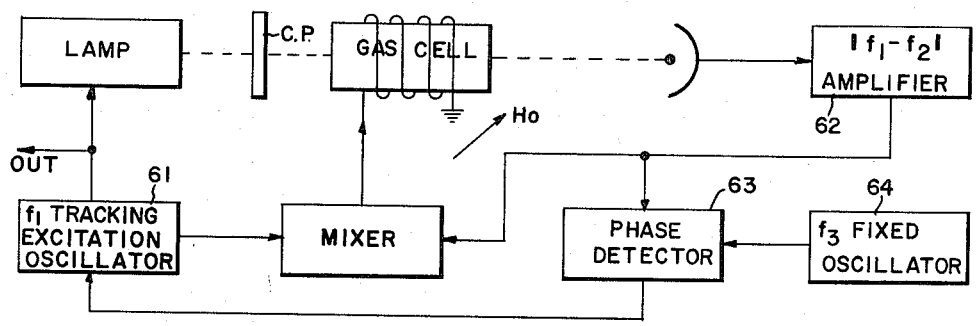
Figure 7A:
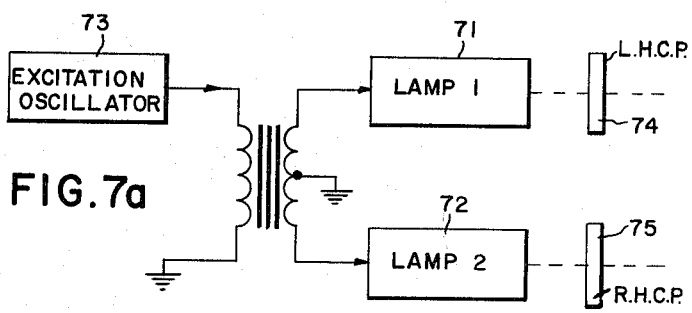
Figure 7B:
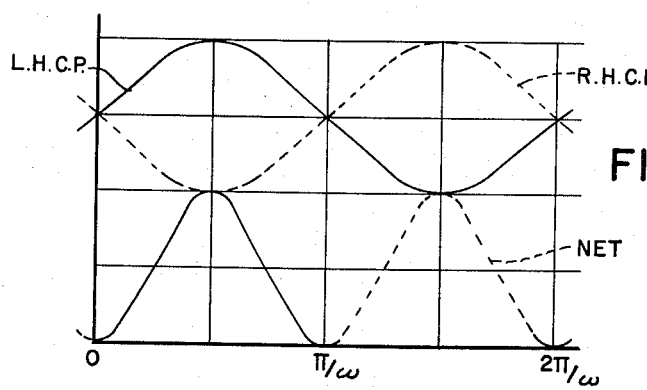

These and other features and advantages of the present invention will become apparent upon a perusal of the following specification taken in connection with the accompanying drawings wherein:

FIG. 1 is a block diagram of an optical pumping system utilized to demonstrate the optically driven spin precession effect of the present invention, FIG. 2 is a block diagram of a resonance-stabilized magnetometer in accordance with the present invention, FIG. 3 is a block diagram of a resonance-stabilized frequency standard in accordance with the present invention, FIG. 4 is a block diagram of a self-oscillating magnetometer in accordance with the present invention, FIG. 5 is a block diagram of an optical self-oscillator utilizing difference frequency intensity modulation in accordance with the present invention, FIG. 6 is a modification of FIG. 5 particularly useful as a wide range magnetometer, FIG. 7A is a block diagram illustrating the use of a plurality of intensity modulated pumping lamps in accordance with the present invention, and FIG. 7B is an intensity v. time plot of the optical radiation from the lamp arrangement of FIG. 7A.

The effect which forms the basis of the present invention will be explained by reference to the basic experiment illustrated in FIG. 1 relating to the Larmor frequency resonance in alkali metal vapors (preferably buffered by being mixed with an inert gas) or metastable helium gas. An optically transparent gas cell 1 contains a low pressure sample of one of the above-named vapors or gas. Hereinafter the term "gas" will be used to designate either a vapor or a gas when appropriate. The lamp 2 produces a beam of the optical resonance radiation of the element contained in the gas cell 1, said beam being directed through a beam modulator 3 which modulates the intensity of the beam at an angular frequency $\omega$, through a circular polarizer 4, and into the gas cell 1. For purpose of this experiment, the beam has a substantial propagation direction component perpendicular to an external unidirectional magnetic field $H_0$. The modulator 3 may assume a wide variety of forms. For example, it could be a mechanical light chopper, Kerr cell, another gas cell at magnetic resonance, or a modulated magnet effecting Zeeman splitting of the lamp radiation. In many instances, it is most convenient to modulate the lamp intensity by simply modulating the lamp excitation power source.

At a given instant of time, $t=0$, the circularly polarized light will produce a small spin polarization in the direction of a weak perturbation field which may be considered to exist at right angles to the field $H_0$. For an unmodulated beam the net polarization is very small or zero since the polarization produced at the given instant immediately starts to precess in the plane perpendicular to $H_0$ at the Larmor frequency $\omega$ and is exactly counterbalanced by the polarization produced by the same beam intensity half a Larmor cycle later at $t=\pi/\omega$. If the beam is intensity modulated at a frequency $\omega$ in the vicinity of the Larmor resonance frequency, however, then the polarization produced at $t=0$ is not exactly cancelled by that produced at $t=\pi/\omega$ and is reinforced by the polarization produced at $t=2\pi/\omega$, $4\pi/\omega$, etc., and a large net precessing spin polarization is thereby built up.

Having thus provided a new technique for producing a precessing spin polarization in an assemblage of quantum systems, such a system may be used in various ways, some of which are already well known in the art. For example, the spins may be directly coupled to a radio frequency coil or microwave cavity and means provided which are responsive to the electrical energy of said coil or cavity. Or, for further example, either the absorption or scattering of optical radiation by the spins may be detected. In our examplary embodiments we simply detect the driving optical pumping radiation which has passed through the gas cell without absorption. In order to understand this mode of utilization, consider the apparatus in a coordinate system rotating at the frequency $\omega$. Since the "rotating" lamp is turned fully on only when it is pointed in a certain preferred direction, it is effectively stationary at a constant intensity in the rotating frame. If the rotation is substantially at the Larmor frequency, the effective field in the rotating frame is zero and the polarization is dominated by the constant light beam. This is a familiar condition under which the non-absorbing magnetic sublevels of the gas cell atoms become preferentially populated thereby effecting a net increase in the transmitted beam intensity. A more precise analysis indicates that the absorption of the optical pumping beam by the gas cell is given by the relation:

(1) $$\frac{-\frac{1}{4}b^2 R M}{R^2 + \Delta\omega^2}$$

($1+$ terms with oscillation at $\omega$ and $2\omega$), where $b$ is the depth of modulation, M is the equilibrium polarization due to the beam alone, R is the net relaxation rate or resonance linewidth, and $\Delta\omega$ is the difference between the driving frequency $\omega$ and the center resonance frequency $\omega_0$. This analysis is also seen to represent an increase in the average intensity of the transmitted beam at resonance.

Thus, in FIG. 1 as the unidirectional magnetic field is slowly swept through the value at which the Larmor resonance frequency $\omega_0$ is equal to the beam modulation frequency $\omega$, by means of sweep generator 5 coupled to sweep coils 6, the transmitted optical radiation detected by the intercepting photocell 7 has a typical resonance shape as seen on the the oscilloscope 8 the vertical deflection plates of which are coupled to the photocell signal via low frequency amplifier 9 and the horizontal deflection plates of which are synchronized with the low frequency sweep generator 5. The same signal could, of course, be observed by sweeping the modulation frequency through the $\omega_0$ frequency for a fixed field intensity. The beam modulation frequency may be considered to be "in the vicinity of resonance," as that term is used herein, whenever $\Delta\omega$ is sufficiently small that the magnitude of the absorption signal as given by Relation 1 is of a detectable magnitude. For most practical cases $\Delta\omega$ would then be less than about $3R$.

In preliminary experiments the above signal was observed in cesium and rubidium vapors at Larmor frequencies between 175 and 350 kc., and in helium at 1.4 mc. In the alkali vapor examples, an interference filter was used to remove the $S_{1/2} \rightarrow P_{3/2}$ line of the resonance radiation, and in the helium example no such filter was used and a high frequency electrodeless discharge was applied to the gas cell to raise the helium atoms to the triplet metastable level. Helium provided the best demonstration of the effect, apparently because a greater index of modulation was achieved with the helium lamps than with the alkali vapor lamps. With a 60-cycle sweep and about 60% modulation of the radio frequency generator used to excite the helium lamp discharge, this signal is comparable in amplitude to the magnetic resonance signals obtained with directly-coupled fields.

Since in FIG. 1 there is disclosed a novel apparatus for obtaining resonance signals, its application to a variety of practical devices will now be apparent to those skilled in the art. For example, in view of the well known fact that the resonance frequency and magnetic field intensity are related through fundamental constants of the interacting quantum systems, this system may be used as a magnetometer by measuring the resonance frequency as a function of the unidirectional field, or as a frequency standard under controlled magnetic field conditions, or as a spectrometer for investigating fundamental properties of quantum systems by controlling both the frequency and the field. A number of novel and particularly advantageous optical pumping instruments in accordance with the present invention will be described with reference to the subsequent figures.

Certain inherent advantages of optical pumping instruments in accordance with the present invention should be particularly noted:

(1) The transitions which may be optically excited are not limited to magnetic dipole transitions as is the case with transitions which may be excited by direct field coupling. Thus many more transitions are potentially useful. One of these is the so-called $g=4$ helium transition for which the resonance frequency is twice that of the usual $g=2$ dipole transition at 2.8 mc./gauss so that, for example, an enhanced magnetometer detection sensitivity is possible.

(2) The beam orientation dead zone for which no signal may be observed is in general limited to a very small, conically-shaped polar region about one particular direction, this being quite desirable for airborne and other mobile applications. For example, in a Larmor frequency magnetometer no dead zone in the equatorial plane perpendicular to the magnetic field is encountered as in the case with direct resonance field coupling.

(3) As can be seen from Relation 1, the signal always increases with increased depth of beam intensity modulation ($b$), so that no saturation is encountered. By contrast, when the effective intensity of a directly coupled resonance frequency field is increased beyond a certain saturation level the signal amplitude decreases, so that, for example, when the field intensity is adjusted to give a signal when the instrument is oriented in a position where the effective resonance field component is small, saturation may be encountered when the instrument is then rotated to a position at which the effective component is increased.

In FIG. 2 there is shown a resonance-stabilized magnetometer system which has been found particularly useful for measuring the earth's magnetic field with a high degree of sensitivity. A helium lamp 11 comprising a constricted discharge tube having externally wound, capacitively-coupled electrode coils 11' at the opposite ends thereof is excited at approximately 100 megacycles by R.F. exciter-generator 13 to provide an intense helium resonance radiation beam passing successively through circular polarizer 12 and helium gas cell 14 in which the helium atoms are raised to a metastable level by an electrodeless discharge produced by a single loop coil 15 coupled to R.F. generator 16, and impinging on photocell 17 which may be a lead sulphide photoconductive film. The excitation generator 13 is amplitude modulated by generator 18 at a nominal frequency of 1.4 megacycles for an average earth's field intensity of 0.5 gauss to thereby effect a corresponding modulation of the lamp intensity and produce resonance spin precessions of the helium atoms as previously described. A low frequency modulator 19 at, for example, 60 cycles, frequency modulates the generator 18 so that any deviation of the field $H_0$ from the reference value corresponding to the frequency of the generator 18 will produce a photocell signal component at the frequency of generator 18 which is of a magnitude corresponding to the extent of the deviation and of a phase corresponding to the direction thereof. This signal is amplified by amplifier 20 and applied to a phase detector 21 which receives a reference signal from the generator 18 to thereby produce a D.C. error or tracking signal tending to maintain the frequency of the generator 18 at the resonance value, as by means of a servomotor. This tracking signal may be used to actuate a recorder 22 which then provides a continuous indication of the magnetic field intensity. Alternatively, the frequency of the generator 18 may be measured directly, as by a ratemeter, to provide this indication.

In the case of the Larmor frequency transitions in the specific examples given above, the nuclear and electronic spins of the atom are strongly coupled so that the two may be considered to precess about the external magnetic field as though they were a single particle. In another class of transitions of interest, particularly at microwave frequencies, known as hyperfine transitions, these two spins are decoupled so that precessions of the electron spin about the nuclear spin must be considered. Although the net spin variation under certain hyperfine resonance conditions is actually in the nature of a "pulsation," for convenience the term "precession" is used herein to comprehend all appropriate hyperfine transitions. Of particular interest, is the so-called "0→0" hyperfine transition in the ground state of the alkali vapor atoms including transitions at the following approximate frequencies: 252 mc. for potassium-41, 462 mc. for potassium-39, 1772 mc. for sodium, 3036 mc. for rubidium-85, 6834 mc. for rubidium-87, and 9193 mc. for cesium. Since these 0→0 transitions are essentially independent of magnetic field intensity for weak magnetic fields, they are particularly useful in a frequency standard wherein a phase detector is used to stabilize the lamp modulating generator to precisely the resonance frequency in a manner similar to that shown in the system of FIG. 2.

One particularly advantageous resonance-stabilized hyperfine frequency standard system is shown in FIG. 3 wherein the output of a crystal controlled oscillator 25 is amplified by an amplifier 26 to energize a small, spherical potassium discharge bulb 27 via a radio frequency coil 27' closely magnetically coupled thereto. The lamp is driven at the 126 mc. subharmonic of the 252 mc. potassium-41 hyperfine frequency, this driving frequency being multiplied to produce a hyperfine frequency modulation of the beam intensity by virtue of the rectifying action of the lamp. Still lower subharmonic driving frequencies may be used by the use of suitable steep wave-shaping circuits in the amplifier 26. This beam is then passed through interference filter 28 and circular polarizer 29 to excite hyperfine resonance precessions in the potassium-41 gas cell 30, and is finally intercepted by the photocell 31 which may comprise a silicon solar cell. The beam is oriented with a substantial propagation direction component parallel to the unidirectional field $H_0$ in order to emphasize the field-independent 0→0 transition. Frequency modulation of the oscillator 25 by modulator 32 at a low frequency gives rise to a photocell signal at the modulation frequency whenever the oscillator 25 departs from the subharmonic of the hyperfine frequency, said signal being amplified by amplifier 33 and compared in phase detector 34 with a reference signal from the modulator 32 to produce a stabilizing lock-in signal which maintains the crystal controlled oscillator 25 precisely at this subharmonic frequency. Whereas this system was described with reference to potassium in view of its advantageously low hyperfine frequency, it may readily be extended to other elements including the rest of the alkali vapors.

As it is frequently desirable to derive the output of a hyperfine frequency standard at a convenient small subharmonic of the hyperfine resonance frequency, it has heretofore been the usual practice to provide considerable frequency multiplication from the basic frequency of the crystal controlled oscillator to the optical control loop. By using optically driven resonance in accordance with the present invention, it is noted that frequency multiplication may also be obtained by the lamp as in FIG. 3 and that this may be used either in the place of or in addition to the usual frequency multiplication. An additional advantage of the frequency standards in accordance with the present invention is that the gas cell does not have to be placed in a cavity resonator at the higher microwave hyperfine frequencies, thereby eliminating the problems of obtaining a large effective spin-beam interaction volume encounted with directly-coupled systems. Although it may be desirable in some instances according to the present invention to excite the lamp within a microwave cavity, this does not present a significant problem as the lamp may be made quite small and does not need to be located in a critical field configuration.

Referring again to Relation 1 above, it will be noted that in the vicinity of resonance there is produced, in addition to the increase in the average intensity of the transmitted beam, intensity modulations at the precession frequency $\omega$ and at twice the precession frequency $2\omega$ which may be advantageously detected, particularly to provide a self-oscillating system. Detection of the $\omega$ component is usually inconvenient, as the large masking effect of the lamp modulation requires the use of a special device such as a bridge circuit. A simple oscillator using a photocell 41 and amplifier 42 responsive to the $2\omega$ modulation is shown in FIG. 4. The frequency output of the amplifier 42 is divided in half by frequency divider 43 and applied to the beam modulator 44 with a proper feedback phase for maintaining a self-sustained resonance frequency oscillation. Such an oscillator may be operated, for example, as a magnetometer by applying the oscillation signal to a frequency meter.

In the basic experiment as described with reference to FIG. 1, if, in addition to modulating the lamp intensity at a frequency $f_1$ in the vicinity of resonance, a radio frequency magnetic field of frequency $f_2$ also in the vicinity of resonance is directly coupled to the spin system, analysis predicts and experiments verify that these two operations will interact to produce a modulation in the photocell signal at the difference frequency $|f_1-f_2|$ when the beam is at an acute angle (preferably 45°) with respect to the $H_0$ field, provided, however, that the intensity $H_1$ of the radio frequency field is substantially below the saturation value. Since the magnitude of this effect depends only on frequency differences and not on the absolute value of the resonance frequency, it is particularly useful in the detection of beam modulation frequencies which are above the range of available photocells. For example, in the case of a directly-coupled helium magnetometer, it is very difficult to obtain a photocell which will follow a variation in beam intensity at an average earth's field Larmor frequency of 1.4 megacycles with sufficient reliability to provide self-sustained oscillation. A similar problem is encountered with even greater severity in the case of modulation at the microwave hyperfine frequencies.

The use of difference frequency detection to provide a simple resonance frequency oscillator is illustrated in FIG. 5 wherein the spins in the gas cell 51 are maintained at a condition of directly-coupled forced resonance at the frequency $f_2$, and the lamp intensity is modulated at the frequency $f_1$ so the photocell 52 needs only be to respond at the difference frequency $|f_1-f_2|$. The photocell signal is amplified by amplifier 53 and combined with the frequency $f_1$ in mixer 54 to produce a difference frequency $f_2$ which maintains the directly-coupled forced precessions in a regenerative feedback manner. It should be noted that the mixer output may be used to modulate the lamp, and the oscillator output used to directly-couple the gas cell, if desired. This oscillator is useful, for example, as either a magnetometer or frequency standard depending on the Larmor or hyperfine transition involved.

FIG. 6 is a modification of FIG. 5 particularly useful as a wide range magnetometer. Here the lamp is excited by a variable frequency tracking oscillator 61 and the output of the difference frequency amplifier 62 is compared in phase detector 63 with a reference signal from an oscillator 64 of fixed frequency $f_3$. The output of the phase detector 63 thus serves to vary the frequency $f_1$ of oscillator 61 in such a way that the difference frequency $|f_1-f_2|$ is always equal to $f_3$. The intensity of the field $H_0$ which determines $f_2$ may thus be indicated by the frequency output of oscillator 61 or alternatively by the error signal generated by phase detector 63. The system of FIG. 6 has the particular advantage that whereas measurements may be made over a wide range of field intensities, the photocell-amplifier oscillating loop can be narrow-banded about the reference frequency $f_3$ to thereby simplify the problem of maintaining the required phase condition for oscillation over the entire measuring range.

It should be understood that under various circumstances it may be desirable to use several intensity-modulated pumping sources. One example of this is shown in FIG. 7A wherein two separate lamps 71 and 72 are driven in push-pull or phase oppositions by an excitation oscillator 73 at the precession frequency. The beams produced by the two lamps are passed through circular polarizers 74 and 75 of opposite senses of circular polarization (left-hand and right-hand). Referring to the lamp intensity v. time plots of FIG. 7B wherein left-hand intensities are represented by a solid line and right-hand intensities by a dashed line, it is seen that the net effect of these two beams when commonly focused on a gas cell is to produce alternate left and right-hand circularly polarized pulses every half Larmor cycle. Thus, the spin polarization is built up every half cycle (as opposed to every full cycle for a single lamp) so that the resonance signal is correspondingly increased. Beams of opposite senses of circular polarization can alternatively be provided by using polarizers of the same handedness, but directing the beam in opposite directions. Another reason for the use of multiple pumping sources would be to eliminate the polar signal dead zone previously described by always insuring that a propagation direction component of detected optical radiation is at right angles to the field.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A method of producing spin precessions in an assemblage of quantum systems having at least one characteristic spin precession resonance frequency with a characteristic resonance linewidth which comprises the steps of irradiating said assemblage with optical pumping radiation, and periodically modulating the intensity of said radiation at a frequency which is within about three said linewidths of said at least one resonance frequency.

2. The method of claim 1 further comprising the step of detecting the pumping radiation which has passed through said assemblage without absorption.

3. The method of claim 2 further comprising the step of applying an alternating magnetic field directly coupling said quantum systems at a second frequency which is also within about three said linewidths of said at least one resonance frequency whereby said detected radiation is modulated at a frequency which is the difference between said intensity modulating frequency and said second frequency.

4. Optical pumping apparatus comprising, a gas cell containing an assemblage of quantum systems having at least one characteristic spin precession resonance frequency, a source of optical pumping radiation periodically irradiating said gas cell, means for modulating the intensity of pumping radiation from said source at a frequency which affects a condition of resonance of said quantum systems, and a photocell for generating a signal responsive to the pumping radiation which has passed through said gas cell without absorption.

5. The apparatus of claim 4 wherein said quantum systems are alkali atoms and said source of pumping radiation comprises an optical resonance radiation discharge of alkali atoms.

6. The apparatus of claim 4 wherein said quantum systems are helium atoms excited to a metastable-state and said source of pumping radiation comprises an optical resonance radiation discharge of helium atoms.

7. The apparatus of claim 6 further comprising means for modulating said condition of resonance at a low frequency, and means responsive to any component in said photocell signal which is at said low frequency for maintaining the frequency of said intensity modulation at the resonance frequency of said spin precession.

8. The apparatus of claim 7 wherein said resonance frequency is at a field-dependent Larmor transition frequency for said quantum systems in a unidirectional magnetic field of unknown intensity, and further comprising means responsive to said intensity modulation frequency for providing an output which varies in accordance with said magnetic field intensity.

9. The apparatus of claim 7 wherein said resonance frequency is at a field-independent hyperfine transition frequency, and said intensity modulation means includes a frequency source which is precisely stabilized by said spin precession, said means for modulating the condition of resonance comprising means for frequency modulating said intensity modulating means.

10. The apparatus of claim 9 wherein said optical pumping radiation source includes a discharge lamp, and said intensity modulating means includes means for exciting said discharge at a subharmonic of said hyperfine transition frequency.

11. The apparatus of claim 4 wherein the signal of said photocell includes a component at a frequency which varies in accordance with the resonance frequency, and further including means applying said component to said intensity modulating means for maintaining self-sustained oscillation of said component at the resonance frequency.

12. The apparatus of claim 11 wherein said resonance frequency is at a field-dependent Larmor transition frequency for said quantum systems in a unidirectional magnetic field of unknown intensity, and further including means responsive to said oscillation frequency for providing an output which varies in accordance with said magnetic field intensity.

13. The apparatus of claim 11 wherein the frequency of said photocell signal component is twice said resonance frequency, and said means applying said component to said intensity modulating means includes a frequency divider.

14. The apparatus of claim 4 further including means for producing an alternating magnetic field directly coupling said quantum systems, said alternating magnetic field being at a frequency which effects resonance spin precession of said quantum systems and the signal of said photocell including a component at a frequency which is the difference between the frequency of said intensity modulation and the frequency of said alternating magnetic field.

15. The apparatus of claim 14 further including a mixer, one input to said mixer consisting of said difference frequency component, the other input of said mixer consisting of one of the frequencies determining said difference frequency, and the output of said mixer being the source of the other frequency determining said difference frequency, thereby establishing a condition of self-sustained oscillation of said mixer output at the resonance frequency of said spin precessions.

16. The apparatus of claim 15 further including a fixed frequency generator, and means responsive to any deviation of said difference frequency from the frequency of said generator.

17. The apparatus of claim 16 wherein said resonance frequency is at a field-dependent Larmor transition frequency for said quantum systems in a unidirectional magnetic field of unknown intensity, and further including means responsive to said oscillation frequency for providing an output which varies in accordance with said magnetic field intensity.

18. The apparatus of claim 4 wherein said optical pumping radiation source includes a plurality of optical resonance radiation discharge lamps.

19. The apparatus of claim 18 including an excitation generator means for driving said discharge lamps in phase opposition, and further including means for circularly polarizing the resonance radiation from each lamp with an opposite sense of circular polarization.

References Cited in the file of this patent

UNITED STATES PATENTS 3,070,698    Bloembergen _____ Dec. 25, 1962

OTHER REFERENCES

Bucka-Zeitschrift fur Physik-Bd., 151, No. 3, May 8, 1958, pages 328 to 339, inclusive.

Alley: The Ann Arbor Conference on Optical Pumping, University of Michigan, June 15 through 18, 1959, paper entitled: Pulse Technique in the Optical Detection of Ground Slate Resonances in Rubidium 87, pages 45–54 incl.

Franzen: Physical Review, vol. 115, No. 4, Aug. 15, 1959, pages 850 to 856 incl. QC-1-P4.

Dodd et al.: Physical Society of London Proceedings, vol. 74, part 6, No. 480, pages 791 and 792, Dec. 1, 1959.

Series-Reports on Progress in Physics, vol. 22, 1959, pages 305 to 315, incl.

De Bolt: Electronics, vol. 33, No. 15, April 8, 1960, pages 55–58.

Mansir: Electronics, vol. 33, Aug. 5, 1960, pp. 47–51 incl.